United States Patent [19]

Speranza

[11] Patent Number: 4,617,620

[45] Date of Patent: Oct. 14, 1986

[54] DC TO DC CONVERTER WITH SELF-STARTING FLYBACK OSCILLATOR

[75] Inventor: Donald Speranza, Canton, Mich.

[73] Assignee: Eaton Corporation, Cleveland, Ohio

[21] Appl. No.: 388,350

[22] Filed: Jun. 14, 1982

[51] Int. Cl.[4] .......................................... H02M 3/338
[52] U.S. Cl. ....................................... 363/19; 363/49; 123/494
[58] Field of Search ..................... 363/19, 49; 310/316, 310/317; 123/494; 331/112

[56] References Cited

U.S. PATENT DOCUMENTS

| | | | |
|---|---|---|---|
| 3,114,096 | 12/1963 | Projain | 363/19 |
| 3,890,612 | 6/1975 | Sweany | 310/317 |
| 4,084,219 | 4/1978 | Furukawa et al. | 363/19 |
| 4,156,157 | 5/1979 | Mabille | 310/316 |
| 4,469,974 | 9/1984 | Speranza | 310/316 |
| 4,537,353 | 8/1985 | Speranza | 310/316 |

FOREIGN PATENT DOCUMENTS 2429567 1/1976 Fed. Rep. of Germany ........ 363/19
2713676 10/1978 Fed. Rep. of Germany ........ 363/19
83162 5/1982 Japan .................................... 363/19

*Primary Examiner*—William H. Beha, Jr.
*Attorney, Agent, or Firm*—Krass & Young

[57] ABSTRACT

A power supply for an acoustic fuel injector (18) comprises a DC to DC converter (14) for supplying a regulated voltage to a frequency-controlled oscillator (16) which drives the injector valve or valves. The converter (14) comprises a flyback oscillator (28) including a switching transistor (32) and a transformer (34, 36) for applying rectified current pulses of variable amplitude and occurrence rate to an output capacitor (42). A variable impedance transistor (50) in the input circuit to the flyback oscillator (28) is controlled by a feedback signal (68) from the output circuit (30) to vary the cycle rate of the flyback oscillator (28) to maintain output voltage at a desired value. Start up of oscillations in flyback oscillator (28) is assisted by a resistive feedback connection (56) and oscillations are maintained by a tertiary transformer winding (38).

6 Claims, 3 Drawing Figures

DC TO DC CONVERTER WITH SELF-STARTING FLYBACK OSCILLATOR

TECHNICAL FIELD

This invention is in the field of regulated DC power supplies and relates particularly to a DC to DC converter circuit capable of providing a stable DC voltage which is independent of variations in an unregulated supply and/or load.

BACKGROUND OF THE INVENTION

There are numerous applications, particularly in the automotive and vehicular field, for a DC to DC converter which operates to provide a highly stabilized output voltage despite substantial variations in the supply voltage furnished by, for example, a 12 volt automotive battery.

One such application is involved in the generation of an AC excitation signal for a ultrasonic fuel injector; i.e., the ability to generate an excitation signal of controlled frequency and amplitude is at least in part dependent upon the stability of the DC voltage which is available to the excitation signal oscillator-generator.

In the fuel injection system application as well as in other applications, it is also advantageous to provide a reliable start up function for the converter oscillator and to minimize the number of required components for production economy.

An oscillator circuit with reliable start up characteristics is shown in FIG. 2.43 of "Design of Solid State Power Supplies", second edition by E. R. Hnatek, Van Nostrand Reinhold Company, page 78. In that circuit the primary winding of an output transformer in the oscillator output circuit is coupled to a tertiary winding in the oscillator input circuit to provide positive feedback. FIGS. 2-44 and 2-45 on page 80 of the same publication illustrate converter circuits having a feedback connection from the output circuit to the inputs of the oscillator for regulation purposes. However, these circuits are characterized by a large number of circuit components with a corresponding lack of production economy.

BRIEF SUMMARY OF THE INVENTION

A DC to DC converter circuit especially useful as a power supply to the oscillator of an acoustic fuel injection system. The converter circuit is characterized by output voltage stability under varying input voltage and load conditions, reliable start up, and low part count. In brief, the advantages of the invention are realized in a converter circuit comprising a flyback oscillator which is coupled to a capacitive output circuit and which is operated in a variable frequency mode by means of a feedback-controlled variable impedance device connected to the oscillator input. A feedback signal representing the output voltage is differentially compared to a reference voltage to control the variable impedance device so as to decrease the oscillator frequency as additional output power is needed.

In the embodiment hereinafter described in detail, the oscillator includes a transformer having a primary winding in series with the active oscillator device, a first secondary winding coupled by a diode rectifier to an output capacitor to charge the capacitor during the flyback interval, and a tertiary winding connected by a diode rectifier to the variable impedance device to maintain oscillations. A resistor connected between the secondary windings provides additional loop gain to assist start up.

DETAILED DESCRIPTION OF THE SPECIFIC EMBODIMENT

Figure 1:
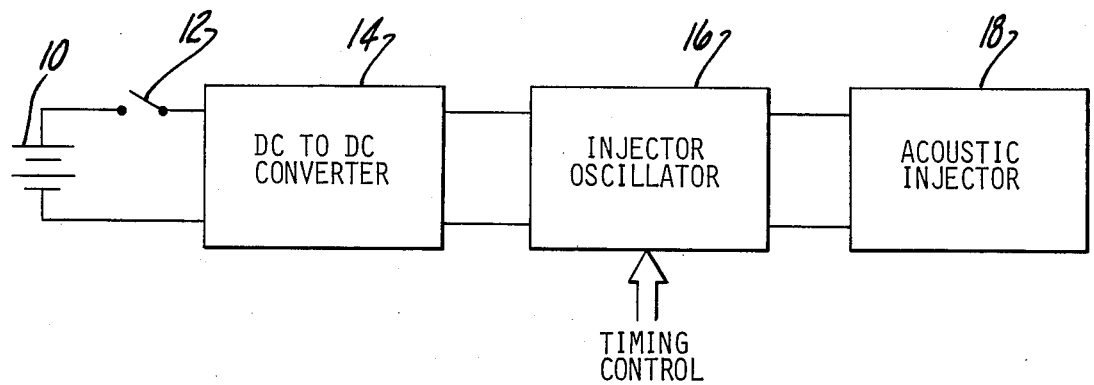
FIG. 1 is a block diagram of an acoustic fuel injection system incorporating the novel converter circuit as a power supply to an oscillator.

FIG. 1 illustrates in block diagram a fuel injector system comprising a conventional 12-volt storage battery 10 connected through a switch 12 to a DC to DC converter 14 which, in accordance with the invention, provides a regulated 200 volt supply voltage to an oscillator circuit 16. The oscillator circuit 16 is connected to an acoustic injector 18, preferably of the catenoidal horn type to excite the injector 18 with an alternating current pulse of closely controlled frequency and amplitude. The timing of the alternating current pulse is a function of engine speed and fuel demand and is controlled by external means not described herein.

A full description of an injector oscillator circuit 16, an acoustic injector 18 having piezoelectric actuator crystals, and of the manner in which the oscillator circuit and injector are connected is given in the co-pending application entitled "Low Power Acoustic Injector Driver Circuit", now U.S. Pat. No. 4,469,974, filed in the name of the present inventor and assigned to Eaton Corporation.

Figure 2:
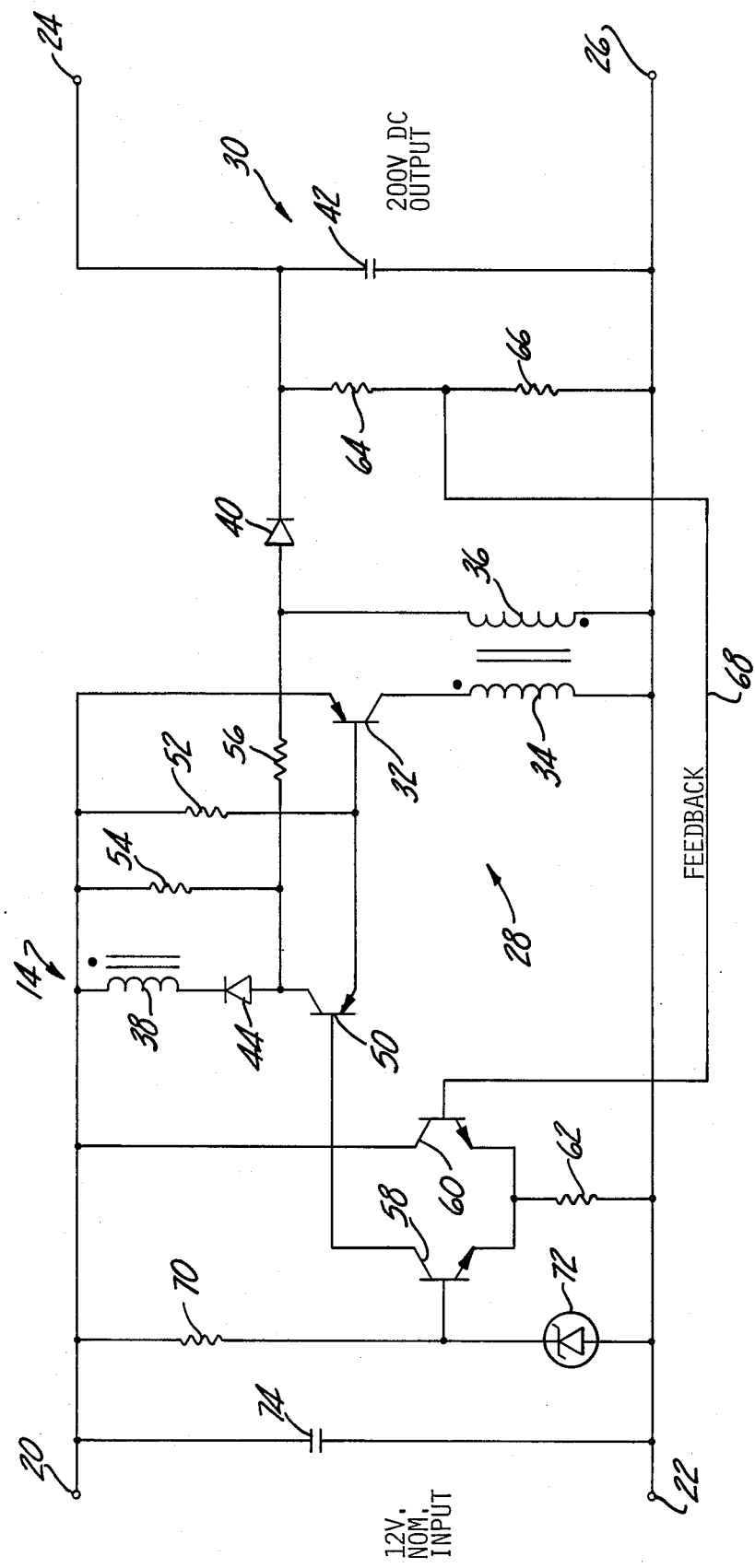
FIG. 2 is a circuit diagram of a DC to DC converter embodying the present invention.

Referring now to FIG. 2, the details of the converter 14 are shown to comprise input terminals 20 and 22 to be connected to the 12 volt battery, and output terminals 24 and 26 across which appears the regulated 200 volt DC output.

Converter 14 further comprises a flyback oscillator generally designated by reference numeral 28 and an output circuit generally designated by reference numeral 30. The principal elements of the flyback oscillator 28 include a pnp transistor 32 and a transformer comprising primary winding 34, secondary winding 36 and tertiary winding 38, all of such windings being wound on a common core in the senses indicated by the dots adjacent the respective windings in FIG. 2. Primary winding 34 is connected in series with the emitter-collector circuit of transistor 32 to receive charging current therefrom during the charging interval. Secondary winding 36 is connected to the output circuit 30 through a diode 40 to supply charging pulses to a capacitor 42 during the flyback interval as hereinafter described. Tertiary winding 38 is connected in series with a diode 44 to maintain oscillations as also hereinafter described.

Figure 3:
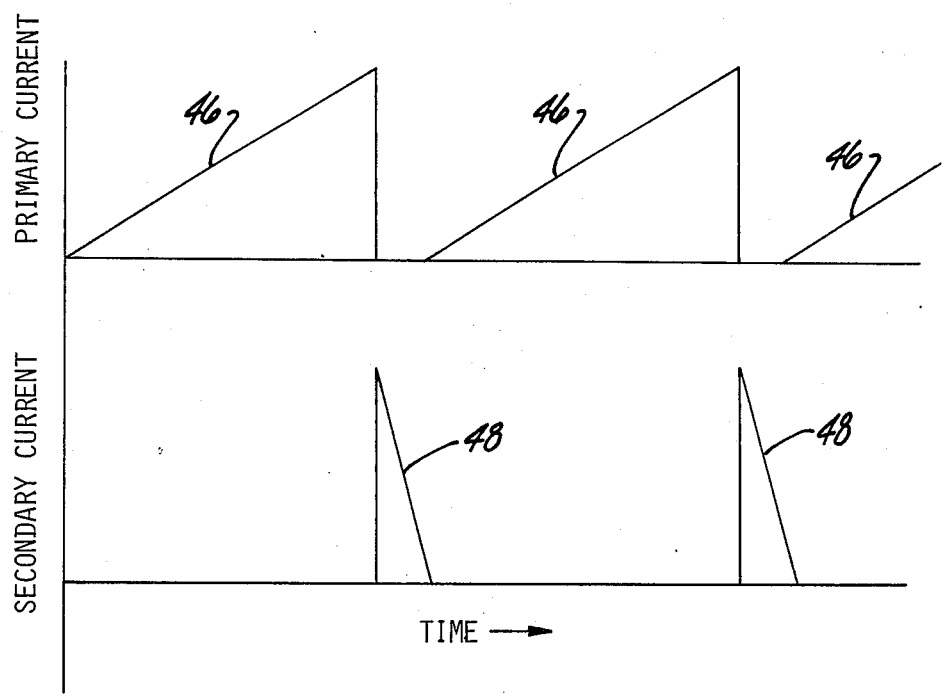
FIG. 3 is a set of waveform diagrams showing the current patterns in the circuit of FIG. 2 under given operating conditions.

Generally, the flyback oscillator 28 produces a current waveform through primary winding 34 comprising ramp-like pulses 46 as shown on the top line of FIG. 3. During the relatively short flyback interval, current flows through the secondary winding 36, through the diode 40 and into the output capitor 42 in the form of pulses 48 as shown on the bottom line of FIG. 3.

To vary the frequency or rate of occurrence of pulses 46 and 48, a variable impedance device in the form of a pnp transistor 50 has its emitter connected to the base of oscillator transistor 32 and to the 12 volt input terminal 20 through a resistor 52, its collector connected to the diode 44, to terminal 20 through a resistor 54 and to the winding 36 through a resistor 56, and its base connected to the collector of an npn transistor 58 which is differentially paired with a similar npn transistor 60 for voltage regulation purposes to be described. The emitters of both transistors 58 and 60 are connected to the grounded input terminal 22 through a resistor 62 and the collector of transistor 60 is connected to the 12 volt input terminal 20. To control the impedance of transistor 50 and, hence, the frequency of the flyback oscillator 28 according to the output voltage across capacitor 42, voltage divider resistors 64 and 66 are connected in series across the capacitor 42 and the junction between the two resistors is connected via feedback line 68 to the base of transistor 60 in the differential pair 58, 60. The base of transistor 60 thus varies in potential in direction proportion to the voltage across capacitor 42 and the output terminals 24, 26. The base of transistor 58, on the other hand, is connected to a steady reference potential provided by the series combination of resistor 70 and Zener diode 72, this series combination being connected across the 12 volt input terminals 20, 22. A capacitor 74 connected across terminals 20, 22 eliminates or reduces current spikes from the battery 10. It is understood that resistor 70 and Zener diode 72 could be replaced by a separate reference voltage source.

Describing now the operation of the circuit of FIG. 2, prior to the closure of switch 12 to apply 12 volts across terminals 20, 22, the output voltage across terminals 24, 26 is zero. When the input voltage is applied, the reference voltage provided by Zener diode 72 comes up immediately to turn transistor 58 on. This allows transistor 58 to draw current through the emitter-base circuits of both transistors 50 and 32, forward biasing transistor 32 to start the oscillator cycle. Since the collector current of transistor 32 is initially small, the transistor 32 saturates and applies the full 12 volt input across primary winding 34. Primary current pulse 46 beings to ramp up as shown in FIG. 3. Since diode 40 prevents any flow of secondary current in winding 36, the primary current is reflected in the base current of transistor 32 through winding 38, diode 44 and transistor 50. When the current in winding 38 builds up sufficiently, it is limited by the conductance of transistor 50. The collector current of transistor 32 rises until it equals the base-emitter current times the transistor gain, at which point transistor 32 comes out of saturation. The voltage across winding 34 falls rapidly, reducing the voltage reflected into winding 38 and this, in turn, reduces the base current in transistor 32 to turn the transistor off in a regenerative fashion. Because diode 44 prevents any reversal of current in winding 38, the energy stored in the transformer during the conductive interval of oscillator transistor 32 is reflected into the winding 36. This energy now produces a sharp pulse 48 of current through diode 40 into the output capacitor 42 to charge the capacitor toward the desired output voltage during the flyback interval.

Resistor 54 provides a soft clamp on the voltage at the anode of diode 44 during the flyback interval. Due to the capacitance of diode 44, a relatively high voltage would couple to the collector of transistor 50 when winding 38 changes polarity in the absence of resistor 54.

As described above, winding 38 provides a feedback effect to maintain oscillations. A further feedback effect which positively aids start up is provided by resistor 56 during the primary charge interval. Resistor 56 acts to increase loop gain just as transistor 32 turns on; i.e., when the current in winding 34 and 38 is still small. Resistor 56 has no function during the flyback interval.

Transistor 58 remains conductive as long as the reference voltage exceeds the feedback voltage applied to the base of transistor 60 by the feedback line 68 from the output circuit 30. The duration of pulses 46 is, therefore, maximized due to the low impedance path for the emitter-base circuits of transistors 32 and 50. This produces maximum energy transfer to the capacitor 42 and consequently rapid charging.

As the output voltage increases toward the desired level, the feedback voltage grows more nearly toward the reference voltage and begins to forward bias transistor 60 and reduce the conductivity of transistor 58. This has the effect of reducing the duration of pulses 46 and increasing the rate at which the pulses occur; i.e., the frequency of the flyback oscillator is increased. As shown in the following formula, this increase in frequency reduces the net power transfer from the primary winding 34 to the secondary winding 36 during the flyback interval. The pertinent relationships are:

(1) Energy $= \frac{1}{2} L_p I_p^2$
Where:
(2) $L_p =$ primary inductance
$I_p =$ peak primary current
(3) $P_t = \frac{1}{2} L_p I_p^2 f$
Where:
(4) $P_t =$ power transferred to secondary
$f =$ frequency of oscillation
(5) $I_p = E T_{on}$
      $L_p$
(6) Where:
$E =$ input voltage
$T_{on} =$ primary charge time during which transistor 32 is conducting
(7) $P_t = \frac{1}{2} E^2 T_{on}^2 f$
$L_p$
Since $T_{on}$ is a very large fraction of the period of oscillation $\tau$,
(8) $T_{on} \approx \tau = \frac{1}{f}$
Therefore:
(9) $P_t = \frac{1}{2} E^2$
$L_p f$ In an actual reduction to practice of the circuit of FIG. 2, the following component values were found to give satisfactory performance:

| | |
|---|---|
| Winding 34 | 12 T, no. 18 |
| Winding 36 | 48 T, no. 27 |
| Capacitor 42 | 22 uf |
| Winding 38 | 16 T, no. 27 |
| Resistor 52 | 10K |
| Resistor 54 | 470 Ohm |
| Resistor 56 | 20K |
| Resistor 62 | 1K |
| Diode 72 | LM 103 |
| Resistor 70 | 18K |
| Capacitor 74 | 330 uf |
| Transistor 32 | D 45 H 11 |
| Transistor 50 | MPS A 92 |
| Transistors 58, 60 | MPS A 42 |
| Transformer Core | 3019 - 400 - 3B7 |
| Resistor 64 | 390K |
| Resistor 66 | 10K |

I claim:

1. A DC to DC converter circuit for producing a regulated DC output voltage from an unregulated supply comprising:

a flyback oscillator including a transistor having an output circuit connectable across the unregulated supply to periodically conduct current therefrom; output circuit means;

transformer means for coupling the output circuit of said oscillator transistor to the output circuit means for receiving and storing eletrical energy therefrom during the interval between said conductivity periods and in amounts which vary with the conductivity period of the oscillator transistor, said transformer means comprising a primary winding in series with the output circuit of the oscillator transistor and a secondary winding in said output circuit means, said primary and secondary windings being magnetically linked;

a variable impedance control transistor connected to the input circuit of the oscillator transistor to vary the conductivity period thereof;

means for establishing a reference voltage;

comparator means connected between the output circuit means, the reference means, and the input circuit of the control transistor to vary the conductivity period according to the energy stored in the output circuit means; and feedback means connected in series with the secondary winding and the output circuit of the control transistor to provide, when connected across said supply, a starting current path for said oscillator transistor.

2. A converter circuit as set forth in claim 1 whrein said oscillator further comprises rectifier means connecting the secondary winding to the capacitor for transferring energy thereto only during the interval between conductivity periods of the oscillator transistor.

3. A converter circuit as defined in claim 1 further comprising a tertiary winding magnetically linked with the primary winding of said transformer means and connected between the supply and the output circuit of the control transistor to provide regenerative feedback whereby current flow through said primary winding due to conduction of said oscillator transistor tends to forward bias the control transistor and regeneratively forward bias the oscillator transistor.

4. Apparatus as defined in claim 3 further including diode means connected in series with said tertiary winding for limiting the flow of current therethrough to a direction which provides said regenerative feedback effect.

5. A converter circuit as set forth in claim 1 wherein said comparator means comprises a differentially connected pair of transistors, the input circuit to one of the comparator transistors being connected to the source of reference voltage and the input circuit of the other of said comparator transistors being connected to the output circuit means for providing a feedback voltage to said comparator means representing the amplitude of the output voltage, the output of one of said comparator transistors being connected directly to the input circuit of said variable impedance control transistor.

6. Apparatus as defined in claim 5 further including voltage divider means connected across said output circuit means, the second of said comparator transistors being connected to said voltage divider means.

* * * * *